8722X
S. FAIRLAMB & J. L. GILPIN.
INKING TYPE.
Patented Mar. 27, 1835.
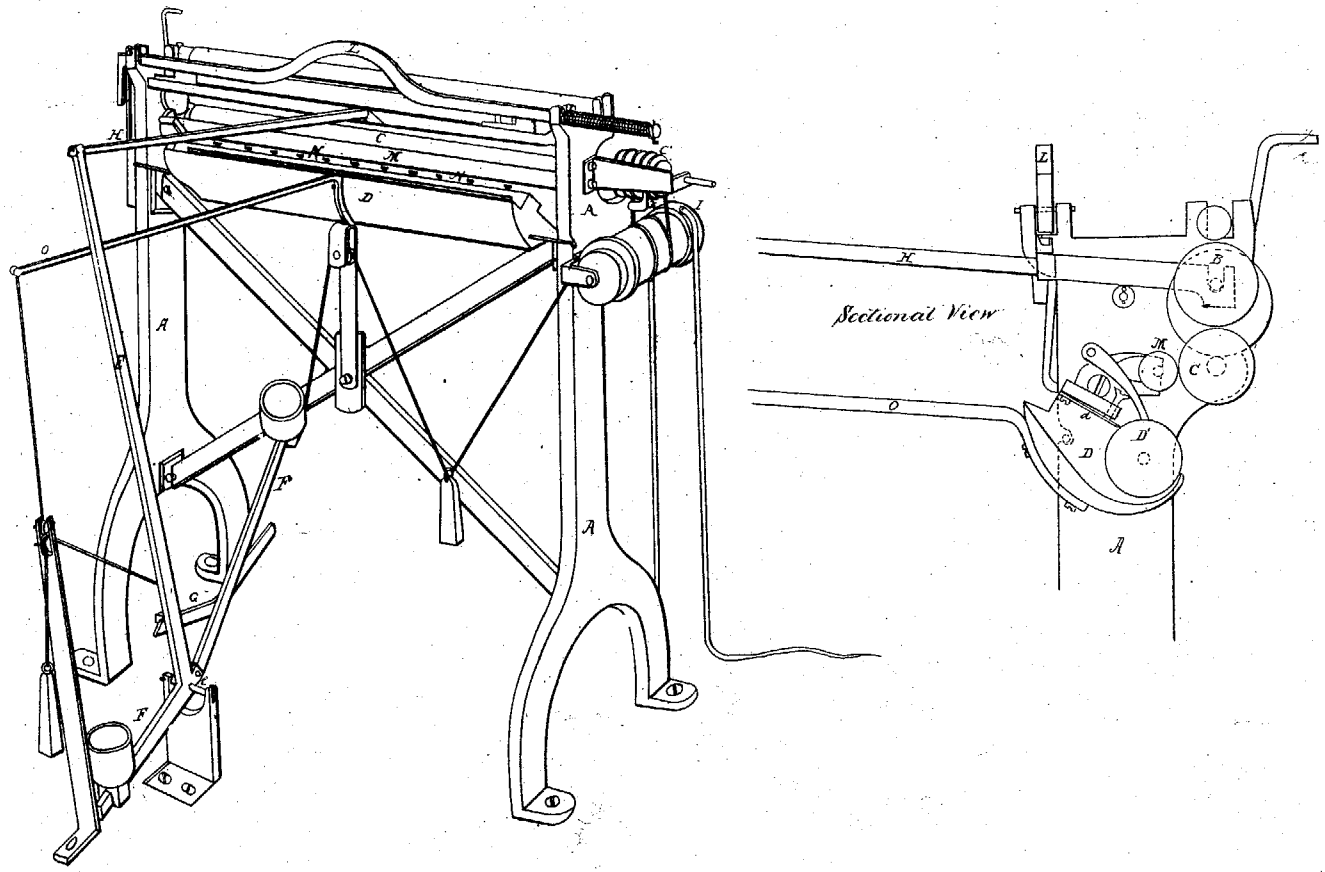

Samuel Fairlamb & John G. Gilpin
8722 X Letters Patent

The Schedule referred to in these Letters Patent and making part of the same containing a description in the words of the said Samuel Fairlamb & John G. Gilpin themselves of their improvement in an Inking Machine for inking types &c.

---

The Machine is composed of a cast iron frame having two upright sides or posts which support the inking roller, a vibrating and distributing roller, a distributing roller and the ink trough or fountain with its roller and scraper. In the rear of the frame there is an upright arm or lever having a horizontal axis at its lower end which rests on carriers or supporters and permits the arm or lever to oscillate; and on this axis are attached two horizontal levers extending in opposite directions, one toward and the other from the press to which the machine may be attached. The one extending from it is permanently fixed on the axis but the other is loose at its fulcrum which is the axis and has a crooked lever loosely attached to its side by a pivot bolt the shortest end next to the upright arm or lever being hooked. The two first of these levers have cups on their ends to hold weights and to the end of the one extending toward the press a cord is attached which passes over a pulley to the rounce of the Machine where it is fastened. A cord is likewise attached to the end of the other lever which passes over a pulley fixed on a carrier in the rear and has a weight fastened to its end. At the upper end of the upright arm or lever is attached by a joint the handle of the frame of the inking roller, all which is nearly in the form of those commonly used with a hand roller except that the frame moves on friction wheels. On the side of the upright part of the frame, which is next to the platten of the press, there is affixed on carriers a rounce, from which straps extend in contrary directions and are fastened to each end of the bed of the press. there are two cords passing around the rounce and to one end of the driving & vibrating roller, which is in the form of a screw, and around which the cords wind in opposite directions; the end of a pin which is permanently fixed on the frame is made to enter the groove of the screw on this roller and causes it to vibrate when in motion. The inking roller with its frame & handle rests on two
wheels

8722X wheels permanently fixed on the frame of the machine above the vibrating and
driving roller coming in contact with it and is held to its place by a spring latch
on the frame entering notches in its frame. A small distributing roller which
receives the ink from the cylinder in the ink trough is in contact with the
driving & vibrating roller & is pressed to it by springs; below this roller in the
rear of the driving roller, the ink trough rests on journals in carriers in the
frame and has a metal cylinder in it resting on its journals and partly im-
mersed in ink; it has a ratchet wheel on the out end of one journal into the teeth
of which a dog fastened on the frame enters and effects its revolution when in
motion, A scraper or regulator is fixed on the ink trough to regulate the ink on
the cylinder, It is made of a thin piece of spring steel or other metal having sim-
ilar qualities and is about three inches wide and as long as the cylinder.
One side of it is fastened by screws or rivets to a piece of metal of nearly the same
width and length and about half an inch thick. The other side of the scraper
is loose from the piece of metal and projects somewhat beyond its edge. The
piece of metal near to its edge has screws passing through it, their lower ends com-
ing in contact with the upper surface of the steel scraper and near to its edge,
and both are secured to the ink trough by screws in such a manner that a
cord of about sixty degrees drawn on the semicircle of the cylinder in the ink
trough will form the line of direction of the edge of the scraper when pressed on
by the screws in the piece of metal to which it is attached though it may be set
to any other angle found convenient; so that its tendency is not directly to the
centre of the cylinder. To regulate the ink on the cylinder the screws are made
to press more or less on any part of the edge of the scraper as may be found necessa-
ry. A lever is fastened to the back part of the ink trough to the end of which a
cord is attached which passes round a pulley beneath it, and then to the up-
right arm or lever which in its movement causes the ink trough to oscillate.
The machine is operated by the movement of the bed of the press by means of the
straps attached to it and the rounce of the Machine. The cord extending from
the rounce of the Machine to the end of the lever next the press to which the
loose lever is attached elevates both so that the hooked end of the loose lever
takes hold of a pin in the lower part of the upright arm or lever, and the weight
on the end of the first mentioned lever descending carries the upright arm or
lever

8722X

[illegible]ver forward, (and with it the inking roller &c. When this weight and
[illegible]vers have descended far enough the end of the crooked (and loose lever meets a
[illegible]ermanent fixture which detaches it from the upright arm or lever when the
weight on the permanent lever in the opposite direction carries it (and with
it the inking roller &c to their first position, where they are held by the spring
ketch on the frame entering notches in the frame of the ink roller (and from
which it is relieved by the timpan when being raised striking & holding back
said ketch. The ink is distributed on all the rollers by the driving and
vibrating roller which is attached to the rounce of the machine by cords; it
having been first communicated to the small distributing roller by the move-
ment of the ink troughs &c

What we claim as of our invention is the application or
manner of applying an elastic scraper to effect the regulation of printing
ink on a cylinder or roller, and the manner of applying gravitating sub-
stances or heavy bodies to propel an inking roller over a form of type &c &c,

Witnesses
Fletcher W. Harper
J. W. Harper

Samuel Fairlamb
John L. Gilpin

[illegible]

(Drawing)